United States Patent
Predovic et al.

(10) Patent No.: US 10,554,721 B2
(45) Date of Patent: Feb. 4, 2020

(54) ACCOUNTING FOR BIAS OF USER CHARACTERISTICS WHEN DETERMINING CONSUMPTION OF CONTENT BY ONLINE SYSTEM USERS

(71) Applicant: Facebook, Inc., Menlo Park, CA (US)

(72) Inventors: Goran Predovic, Redmond, WA (US); Liang Xu, Bellevue, WA (US); Stephane Taine, Issaquah, WA (US)

(73) Assignee: Facebook, Inc., Menlo Park, CA (US)

(*) Notice: Subject to any disclaimer, the term of this patent is extended or adjusted under 35 U.S.C. 154(b) by 1075 days.

(21) Appl. No.: 14/866,059

(22) Filed: Sep. 25, 2015

(65) Prior Publication Data
US 2017/0093650 A1 Mar. 30, 2017

(51) Int. Cl.
*G06F 15/16* (2006.01)
*H04L 29/08* (2006.01)

(52) U.S. Cl.
CPC .............. *H04L 67/02* (2013.01); *H04L 67/22* (2013.01)

(58) Field of Classification Search
CPC . H04L 12/1475; H04L 12/1496; H04L 67/02; H04L 67/22; H04L 67/306; H04M 15/00; H04M 15/07; H04M 15/09; H04M 15/64; H04M 15/8083
See application file for complete search history.

(56) References Cited

U.S. PATENT DOCUMENTS

| | | | |
|---|---|---|---|
| 2013/0080526 A1* | 3/2013 | Gill | G06Q 10/10 709/204 |
| 2015/0012350 A1* | 1/2015 | Li | G06Q 30/0243 705/14.42 |
| 2016/0125490 A1* | 5/2016 | Angal | G06Q 30/0609 705/26.35 |

* cited by examiner

*Primary Examiner* — Normin Abedin
(74) *Attorney, Agent, or Firm* — Fenwick & West LLP (57) ABSTRACT

An online system determines one or more metrics describing consumption of content by various users by identifying users of the online system capable of being identified based on information received from multiple client devices. For example, the online system identifies users associated with user identifiers that are also associated with other types of identifying information (e.g., cookies, device identifiers). From the identified users, the online system generates a set of users based on a distribution of characteristics. The distribution of characteristics may be determined by the online system as characteristics of a group of users or received by the online system from a third party system and describes characteristics of users of the third party system. Based on interactions with content by users in the set, the online system determines one or more metrics describing consumption of content.

20 Claims, 3 Drawing Sheets

ACCOUNTING FOR BIAS OF USER CHARACTERISTICS WHEN DETERMINING CONSUMPTION OF CONTENT BY ONLINE SYSTEM USERS

BACKGROUND

This disclosure relates generally to online systems, and more specifically to accounting for bias of characteristics for online system users when determining metrics describing consumption of content by online system users.

Various online systems provide content to client devices for presentation to online system users via one or more networks. An online system may select content for presentation to a user based on information about the user maintained by the online system. For example, an online system allows a user to establish connections between other users and to provide content to the online system, which provides the content to the other users connected to the user. The increasing popularity of online systems, and the significant amount of user-specific information maintained by online systems, allow users of an online system allows to easily communicate information about themselves to other users and share content with other users.

Additionally, entities may sponsor presentation of content items via an online system to gain public attention for the entity's products or services, or to persuade online system users to take an action regarding the entity's products or services. Many online systems receive compensation from an entity for presenting online system users with certain types of sponsored content items provided by the entity. Frequently, online systems charge an entity for each presentation of sponsored content to an online system user (e.g., each "impression" of the sponsored content) or for each interaction with sponsored content by an online system user (e.g., each "conversion"). For example, an online system receives compensation from an entity each time a content item provided by the entity is displayed to a user on the online system or each time a user is presented with a content item on the online system and the user interacts with the content item (e.g., requests additional content by interacting with the content item)

Entities that provide content items to users through online systems often determine various metrics describing consumption of content items by online system users. For example, an entity determines a reach of a content item by identifying a number of unique users of an online system were presented with the content item. As another example, the entity determines a number of times a user of an online system was presented with or otherwise viewed the content item, providing a frequency with which the content item was presented to online system users. Metrics describing consumption of content items provided by the entity to users via the online system allows the entity to evaluate the effectiveness of strategies for content distribution by the entity.

However, many online systems are unable to accurately determine certain metrics describing content item consumption by their users. For example, online systems may associate identifying information with users that identify client devices used by the users rather than the users themselves, preventing accurate identification of unique online system users presented with a content item, but instead identifying client devices on which the content item was presented, which may be used by the same online system user. Additionally, various information used by online systems to identify users (e.g., cookies) may be modified or deleted by the users, which may cause a user to associate new information with the user for identification. Associating new identifying information with a user who deleted identifying information previously associated with the user prevents many conventional online systems from determining if the same user has previously consumed content presented to the user.

SUMMARY

To more accurately determine metrics describing presentation of content items to online system users, an online system identifies users of the online system whom the online system is capable of identifying across various client devices. In various embodiments, the online system identifies users associated with user identifiers maintained by the online system that are associated with other types of identifying information. Example types of identifying information include a device identifier (e.g., an Internet Protocol address), a unique identifier assigned by the online system, an application identifier, and one or more cookies. The online system may perform various methods to identify users across different client devices and store information associated with users who the client device may identify using different information that allows the users to be identified on different client devices.

The online system obtains a distribution of characteristics of users that identifies one or more characteristics of users. For example, the distribution identifies various demographic information or other characteristics of users. In some embodiments, the online system identifies users who have retrieved or who have accessed content from a third party system and determines the distribution based on characteristics of the identified users. This allows the distribution to specify characteristics of users who have retrieved or who have accessed content from the third party system. As another example, the online system identifies a group of users and determines the distribution based on characteristics of users in the group; hence, the distribution identifies characteristics of users in the group. The group of users may represent a demographic makeup of a specific population (e.g., users of a network). Characteristics of users may be retrieved from information included in user profiles associated with the users by the online system or from other information associated with the users by the online system. For example, characteristics of a user include demographic information associated with the user.

Based on the distribution of characteristics and characteristics of the identified users who the online system is capable of identifying across various client devices, the online system generates a set of users having characteristics matching the distribution of characteristics. Hence, the set of users has characteristics (e.g., demographic information) matching the distribution of characteristics and includes users capable of being identified by the online system when using various client devices to communicate with the online system. Because the set of users is identified based on the distribution of characteristics, the set of users is representative of various users having the distribution of characteristics, which mitigates bias in characteristics of the online system capable of being identified by the online system across various client devices.

As the online system is capable of identifying users in the set across various client devices, including a tracking mechanism that communicates information to the online system including information identifying a user retrieved from a client device and identifying content presented by the client device included in content presented to users in the set, this allows the online system to more accurately calculate one or more metrics describing presentation of content. For example, a tracking mechanism included in a content item comprises instructions that, when executed by the client device presenting the content item, obtains information identifying the content and information stored on the client device identifying a user of the client device and causes the client device to communicate the obtained information to the online system. In some embodiments, instructions comprising the tracking mechanism are executed by the client device if a user presented with content by the client device performs an action with the content matching an action identified by the tracking mechanism. Because the online system associates various types of identifying information with a user identifier of a user included in the set, the online system is more accurately able to identify content presented to a particular user when tracking mechanisms provides the online system with different types of information identifying the user. For example, if a content item is presented to a user in the set on multiple client devices that are each associated with different client device identifiers, if tracking mechanisms executed by different client devices communicate an identifier of the content item and client device identifiers corresponding to different client devices executing the tracking mechanisms, because the user is in the set, the online system associates various client device identifiers with a user identifier of the user. This allows the online system to determine that the content was presented to the user rather than to different users by identifying the user identifier associated with the various client device identifiers. Hence, the online system may more accurately identify unique users from the set presented with different content items (i.e., the reach of the different content items) and the number of times the unique users from the set are presented with a content item (i.e., the frequency with which users interact with the content item). Based on the reach and frequency determined for users in the set, the online system may extrapolate the reach and frequency of content items for a larger number of users, providing more accurate information about content consumption of users with characteristics matching the obtained distribution.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
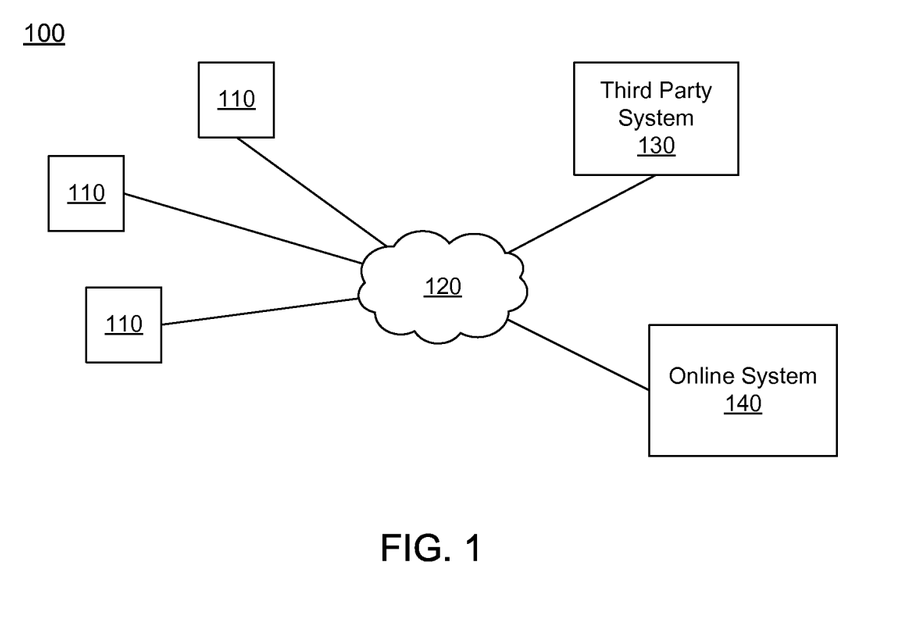
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information to client devices 110 for presentation. A third party system 130 may also communicate information to the online system 140, such as advertisements, content, or information about an application provided by the third party website 130.

Figure 2:
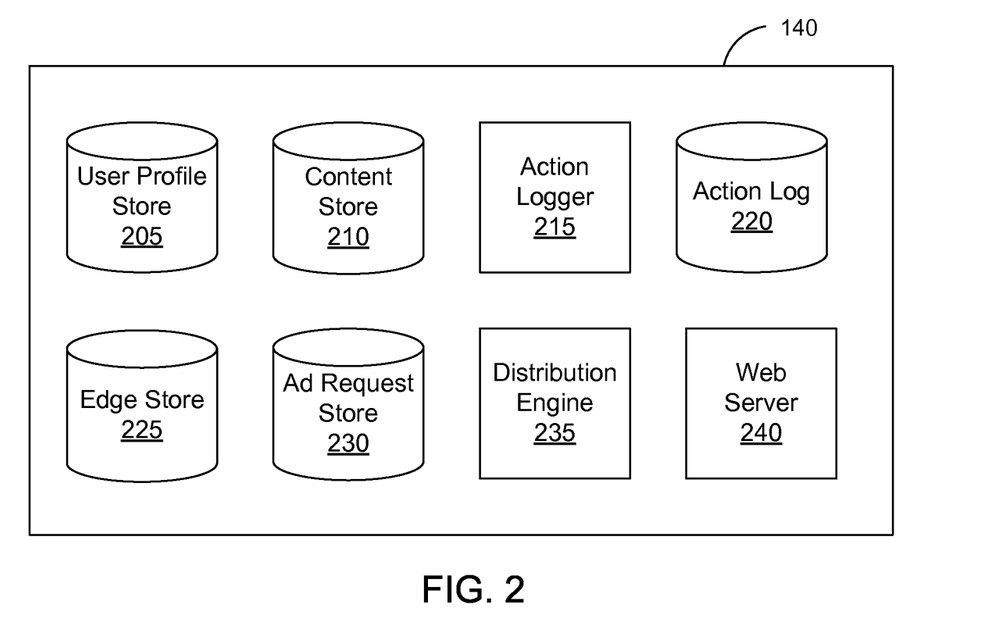
FIG. 2 is a block diagram of an online system, in accordance with an embodiment.

FIG. 2 is an example block diagram of an architecture of the online system 140. The online system 140 shown in FIG. 2 includes a user profile store 205, a content store 210, an action logger 215, an action log 220, an edge store 225, an advertisement request ("ad request") store 230, a distribution engine 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image, with information identifying the images in which a user is tagged stored in the user profile of the user.

The online system 140 associates a user identifier with each user profile that uniquely identifies the user profile and its corresponding user. Other types of identifying information may be included in a user profile and associated with the user profile associated with the user profile, allowing the online system 140 to receive various types of identifying information and identify a user identifier corresponding to the identifying information. Example types of identifying information include a device identifier (e.g., an Internet Protocol address), an application identifier, and one or more cookies. As further described below, this allows the online system 140 to more accurately identify users based on information received from client devices.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Additionally, content items included in the content store 210 may be communicated to one or more third party systems 130 for presentation by the third party systems 130. Hence, online system users are encouraged to communicate with each other by posting text and content items of various types of media through various communication channels. This increases the amount of interaction of users with each other and increases the frequency with which users interact with the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with the particular users as well and stored in the action log 220.

The action log 220 may be used by the online system 140 to store user actions on the online system 140, as well as actions on third party systems 130 that communicate information to the online system 140. Users may interact with various objects on the online system 140, and information describing these interactions is stored in the action log 210. Examples of interactions with objects include: commenting on posts, sharing links, and checking-in to physical locations via a client device 110, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In some embodiments, the action logger 215 receives information from a tracking mechanism included in content presented by a client device 110. The received information includes information stored on the client device 110 identifying users as well as information identifying content presented by the client device 110 (e.g., an identifier of a content item). In various embodiments, the information received from the tracking mechanism (e.g., a tracking pixel) includes information describing one or more actions performed by the user and associated with the content item. The action logger 215 may compare the received information stored by the client device 110 to identify a user to the identifying information associated with user identifiers maintained by the online system 140 to identify a user identifier of an online system user corresponding to the received information stored by the client device 110 to identify the user. For example, the action logger 215 receives a description of an action, an identifier of a content item, and an Internet Protocol address of a client device 110 from a tracking mechanism and compares the Internet Protocol address to Internet Protocol addresses associated with various user identifiers in the user profile store 205; if the action logger 215 identifies a user identifier associated with the Internet Protocol address, the action logger 215 stores the user identifier, the description of the action, and the identifier of the content item in the action log 220.

In various embodiments, the action logger 215 may implement one or more methods to identify a user identifier associated with received information stored by a client device 110 to identify a user. For example, if information received from a tracking mechanism includes information stored by a client device 110 identifying a user (e.g., a cookie) that does not match identifying information associated with a user identifier, the action logger 215 identifies an overlap sequence of Internet Protocol addresses associated with multiple occurrences of the information received from the tracking mechanism and multiple occurrences in information associated with the user identifier (e.g., a number of times information describing interactions by the information received from the tracking mechanism includes the Internet Protocol addresses). The action logger 215 determines an overlap score based on the identified overlap sequence of Internet Protocol addresses, with the overlap score providing a measure of how closely information from the tracking mechanism is associated with the user identifier. In one embodiment, the action logger 215 determines the overlap score based on the number of times the user identifier and information from tracking mechanism account are both associated with the same Internet Protocol address during a time period. The action logger 215 associates the information from the tracking mechanism and the user identifier based on the overlap score (e.g., if the overlap score equals or exceeds a threshold value). Identifying an overlap sequence and determining an overlap score is further described in U.S. patent application Ser. No. 14/641,256, filed on Mar. 6, 2015, which is hereby incorporated by reference in its entirety.

The action logger 215 may also identify a cluster of client devices 110 or applications that communicate with the online system 140 using a common Internet Protocol address during a specified time interval. For example, the action logger 215 identifies an association between a cluster of client devices 110 and a user identifier based on Internet Protocol addresses of the client devices 110. The action logger 215 determines times when the client devices 110 associated with the Internet Protocol address communicated with online system 140 (i.e., usage times) and identifies candidate clusters of client devices 110, where a candidate cluster of client devices 110 includes client devices 110 associated with an Internet Protocol address and associated with usage time periods that overlap by at least a threshold amount.

From the candidate clusters of client devices 110, the action logger 215 identifies one or more stable clusters of client devices 110. A stable cluster of client devices 110 is a cluster of client devices 110 for which the action log 220 maintains times identifying communications with the client devices 110 in the cluster for at least a threshold length of time. The stable cluster of client devices 110 is associated with information received from a tracking mechanism. The action logger 215 associates a user identifier with the information received from the tracking mechanism if one or more Internet Protocol addresses associated with communications between the online system 140 and the user identifier match Internet Protocol addresses in the stable cluster of client devices 110 associated with the information received from the tracking mechanism. Determining clusters of client devices 110, identifying stable clusters of client devices 110, and identifying a user identifier associated with a stable cluster of client devices 110 is further described in described in U.S. patent application Ser. No. 14/641,256, filed on Mar. 6, 2015, which is hereby incorporated by reference in its entirety.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object, in a topic, or in another user in the online system 140 based on the actions performed by the user. A user's affinity may be computed by the online system 140 over time to approximate the user's interest in an object, in a topic, or in another user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content, also referred to as an "advertisement" and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if advertisement content in an ad request is displayed. In some embodiments, the expected value to the online system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The distribution engine 235 determines one or more metrics describing presentation of content items to various users of the online system 140. For example, the distribution engine 235 determines a reach of a content item by identifying a number of unique users of the online system 140 who were presented with the content item. As another example, the distribution engine 235 determines a number of times one or more users of the online system 140 were presented with or otherwise interacted with the content item, providing a frequency with which online system users viewed or interacted with the content item. In some embodiments, a third party system 130 includes a tracking mechanism in a content item that communicates information to the online system 140 including information identifying a user retrieved from a client device 110 and identifying the content item. For example, the tracking mechanism comprises instructions that, when executed by a client device 110 presenting a content item, obtains information stored on the client device 110 identifying the user and the content item and communicates the obtained information to the online system 140. However, different client devices 110 may store different information identifying a user or information stored on a client device identifying a user may be changed over time, so the online system 140 may be unable to identify user identifiers maintained by the online system 140 corresponding to information received from a tracking mechanism.

To more accurately determine one or more metrics describing distribution of content items, the distribution module 235 identifies users of the online system 140 capable of being identified across multiple client devices 110. Hence, the distribution module 235 identifies users having one or more types of identifying information associated with their user identifiers in their user profiles. The distribution module 235 obtains a distribution of characteristics for users and generates a set of the identified users so characteristics of identified users in the set match the distribution of characteristics. As the action logger 215 receives information from a tracking mechanism included in a content item and associates interactions with or accesses of the content item by identified users in the set, the distribution module 235 generates one or more metrics for the content item based on the interactions with or accesses of the content item by identified users in the set. This allows the distribution engine 235 to leverage users who the online system 110 is capable of identifying across multiple client devices 110 by generating a set of the users capable of being identified across multiple client devices having an obtained distribution of characteristics, allowing more accurate determination of various metrics describing consumption of content items, as further described below in conjunction with FIGS. 3 and 4.

The web server 245 links the online system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, or BlackberryOS.

Accounting for Bias when Determining Metrics for Content

Figure 3:
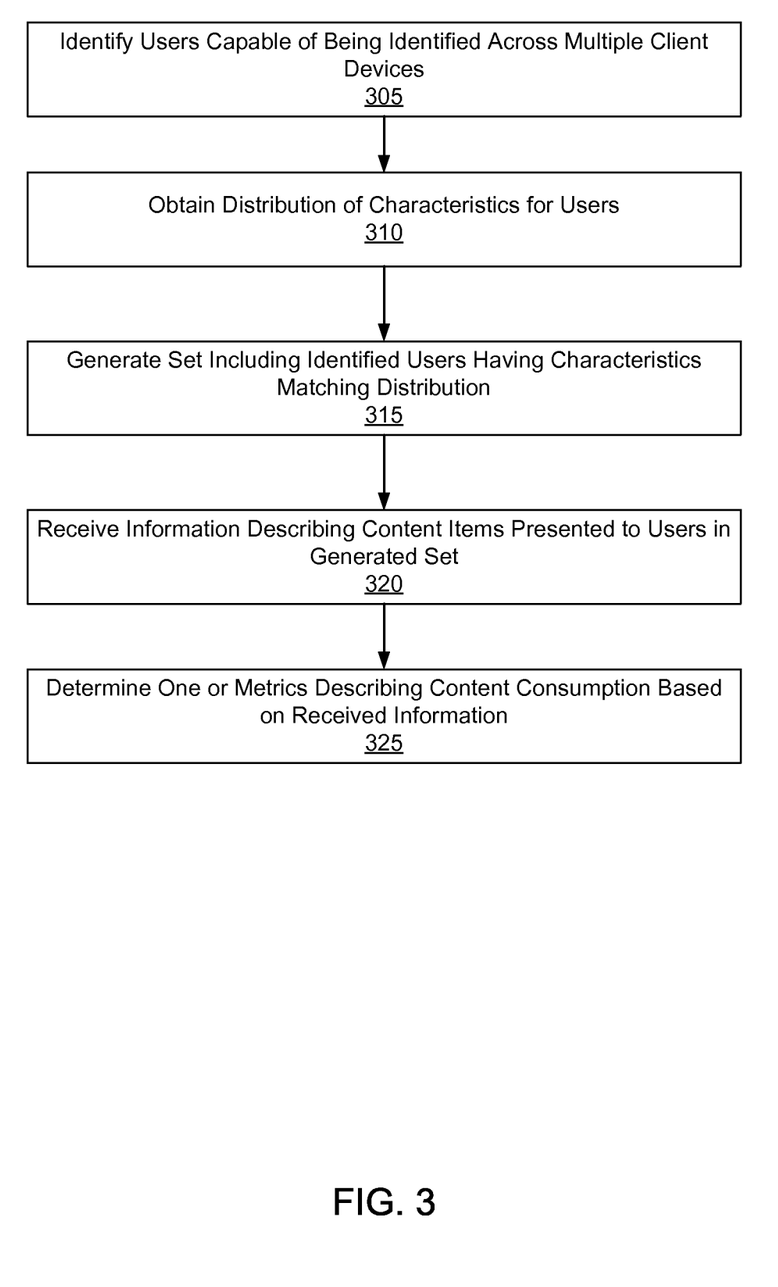
FIG. 3 is a flowchart of a method for determining one or more metrics for presentation of content to a set of users having a specific demographic distribution, in accordance with an embodiment.

FIG. 3 is a flowchart illustrating one embodiment of a method for determining one or more metrics describing consumption of a content item by users having an obtained distribution of characteristics. In some embodiments, the method may have different and/or additional steps than those described in conjunction with FIG. 3. Additionally, in some embodiments, steps of the method are performed in different orders than the order described in conjunction with FIG. 3.

The online system 140 identifies 305 users capable of being identified by the online system 140 across multiple client devices 110. A user capable of being identified by the online system 140 across multiple client devices 110 is a user for whom the online system 140 associates additional types of identifying information with a user identifier identifying the user to the online system 140. This allows the online system 140 to determine a user identifier corresponding to the user when the online system 140 receives various types of identifying information from one or more client devices 110. Example types of identifying information include a device identifier (e.g., an Internet Protocol address), a unique identifier assigned by the online system 140, an application identifier, and one or more cookies. Additionally, a user capable of being identified across multiple client devices 110 may be a user whom the online system 140 has associated information along with actions associated with the user that is capable of being compared to information received from a client device 110, as further described above in conjunction with FIG. 2.

However, characteristics of the identified users may be biased towards characteristics of certain segments of online system users, so analyzing interactions by the identified users with various content items may not accurately reflect interactions by online system users having different characteristics. To offset potential bias in characteristics of the identified users relative to characteristics of other online system users, the online system 140 obtains 310 a distribution of characteristics of users that identifies one or more characteristics of users. The distribution identifies various demographic information or other characteristics of online system users, so the distribution represents characteristics describing a group of online system users. For example, the distribution identifies one or more age ranges, a gender, one or more locations, or other suitable characteristics.

In some embodiments, the online system 140 obtains 310 the distribution of characteristics based on characteristics of users who have previously interacted with content from a third party system 130. For example, the third party system 130 includes a plug-in in various content items (e.g., web pages) that communicates with the online system 140 to identify an online system 140 user presented with the content item. The plug-in may also communicate information to the online system 140 describing interactions by the user with one or more content items provided by the third party system 130 to the online system 140, allowing the online system 140 to identify content items from the third party system 130 presented to the user or to identify actions by the user with content items from the third party system 130. As another example, the third party system 130 includes a tracking mechanism in various content items provided to users that retrieves identifying information from a client device 110 presenting a content item from the third party system 130 and communicates the retrieved information and an identifier of the content item to the online system 140. The online system 140 may identify a user of the online system 140 from the information received from the tracking mechanism and store the identifier of the content item in association with the user of the online system 140, allowing the online system 140 to determine online system users who were presented with content items from the third party system 130 or who interacted with content items from the third party system 130. The online system 140 may obtain 310 the distribution based on characteristics of users associated with information identifying content items from the third party system 130 that were presented to the users or based on characteristics of users associated with information indicating the users interacted with content items provided by the third party system 130. For example, the online system 140 obtains 310 the distribution as characteristics of a specified percentage or number of the users associated with information identifying presentation of or interaction with content items from the third party system 130. As another example, the online system 140 obtains 310 the distribution as an average of characteristics of the users associated with information identifying presentation of or interaction with content items from the third party system 130.

In other embodiments, the third party system 130 or another entity may provide the distribution of characteristics to the online system 140, allowing the third party system 130 to specify a segment of online system users having specific characteristics. The online system 140 may retrieve information describing a distribution of characteristics of various users, such as census data or data derived from market analysis. Alternatively, the online system 140 samples various users of the online system 140 and generates the distribution based on characteristics of the sampled users (e.g., based on characteristics included in user profiles of at least a threshold number of the sampled users). Sampling larger numbers of users allows the online system 140 to obtain 310 a distribution of characteristics likely to reflect characteristics of online system users as a whole or to obtain 310 a distribution of characteristics likely to reflect characteristics of users of a network 120, such as the Internet. Increasing a number of users sampled and determining a distribution of characteristics based on characteristics of the sampled users may allow the online system 140 to obtain 310 a distribution that is likely to reflect global characteristics of online system users.

Based on the distribution of characteristics and characteristics of the identified users who the online system 140 is capable of identifying across various client devices 110, the online system 140 generates 315 a set of users having characteristics that match the distribution of characteristics. For example, if the distribution of characteristics specifies male users ages 18-34, the online system 140 generates 315 a set including users that the online system 140 is capable of identifying across various client devices 110 who are males between the ages 18-34. Hence, the set of users has characteristics (e.g., demographic information) matching the distribution of characteristics and includes users capable of being identified by the online system 140 when using various client devices 110 to communicate with the online system 140. Generating the set based on the obtained distribution allows the online system 140 to offset over-represented or under-represented characteristics of users capable of being identified by the online system 140 across multiple client devices 110 relative to characteristics in the distribution.

Figure 4:
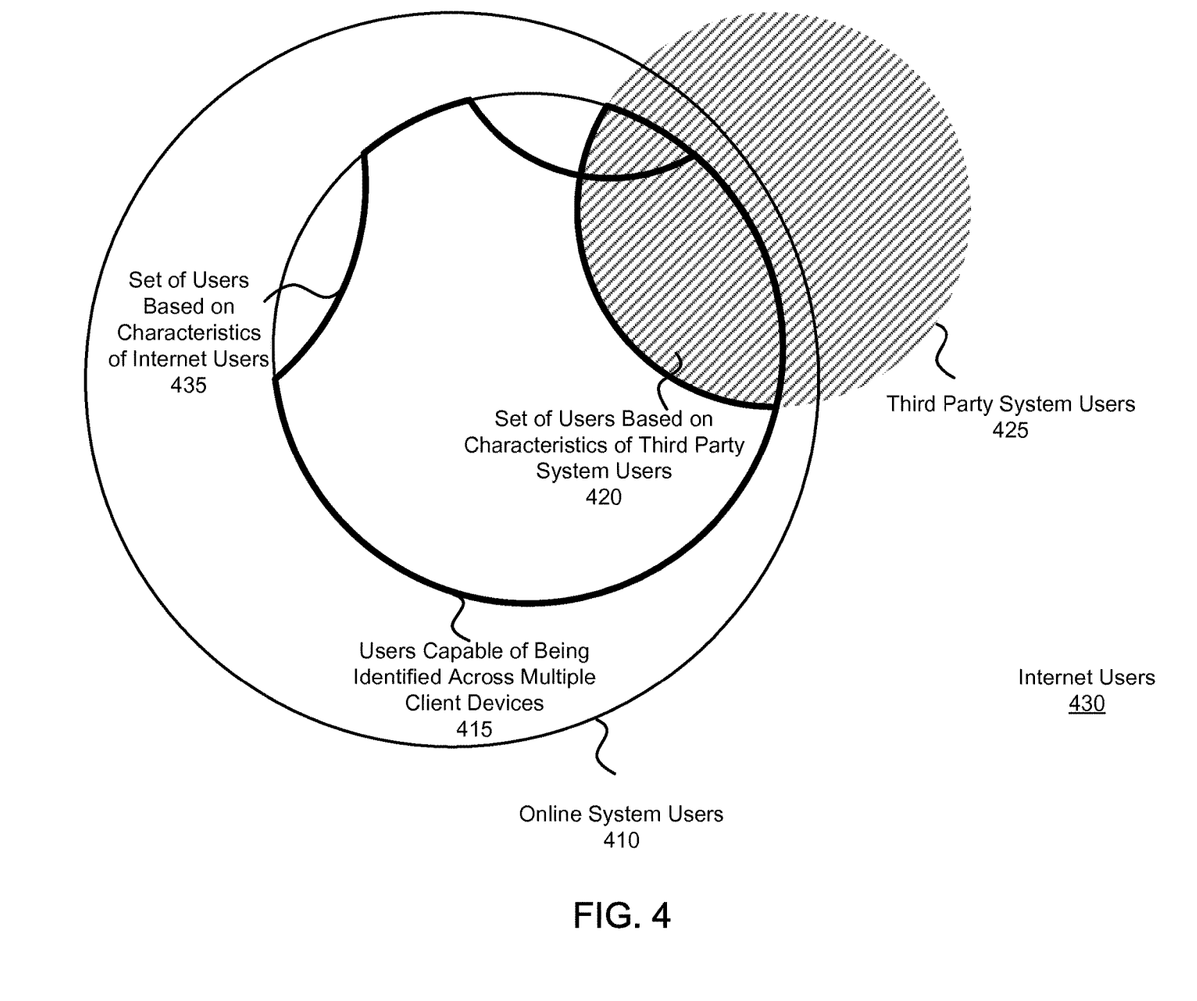
FIG. 4 is a conceptual diagram of selecting a set of users capable of being identified across multiple client devices based at least in part on a distribution of characteristics, according to one embodiment.

FIG. 4 shows an example selection of a set of users capable of being identified by the online system 140 across multiple client devices 110 based at least in part on a distribution of characteristics. In the example of FIG. 4, online system users 410 are a subset of Internet users 430. While FIG. 4 identifies Internet users 430, the online system users 410 may be a subset of users of any suitable network 120. As described above in conjunction with FIGS. 2 and 3, the online system 140 includes different types of identifying information in association with certain users of the online system 140, allowing the online system 140 to identify the users from different types of identifying information received from client devices 110. For example, the online system 140 associates one or more device identifiers and one or more cookies with a user identifier of the online system 140, allowing the online system 140 to identify the user identifier from device identifiers or cookies received from various client devices 110. Hence, the online system 140 has a subset of users 415 capable of being identified from different types of identifying information received from various client devices 110.

From the subset of users 415 capable of being identified from various types of identifying information received from client devices 110, the online system 140 generates a set of users based on a distribution of characteristics. For example, the online system 140 obtains information describing a distribution of characteristics of users 425 of a third party system 130 and generates a set 420 of users capable of being identified from various types of identifying information received from client devices 110 having characteristics matching the distribution of characteristics. Hence, the set 420 includes users capable of being identified by the online system 140 based on various types of identifying information received from client devices 110 and having a distribution of characteristics matching characteristics of the users 425 of the third party system 130. This increases the likelihood of information obtained about the set 420 providing an accurate representation of information about the users 425 of the third party system 130.

Similarly, the online system 140 may generate a set 435 of users having a distribution of characteristics matching a distribution of characteristics of Internet users 430 from the subset of users 415 capable of being identified from various types of identifying information received from client devices 110. As described above in conjunction with FIG. 3, the set 435 includes users that the online system 140 is capable of capable identifying from various types of identifying information received from client devices 110 and that have characteristics matching the distribution of characteristics of the Internet users 435. The online system 140 may sample a large number of the online system users 410 and determine a distribution of characteristics of the online system users 410 as the distribution of characteristics of the Internet users 430 in some embodiments.

Referring back to FIG. 3, the online system 140 is capable of identifying users in the set across various client devices 110, so the online system 140 subsequently receives 320 information from client devices 110 describing content items presented to users in the set or content items with which users in the set interacted and associates received information with a corresponding user in the set. For example, the third party system 130 includes a tracking mechanism in a content item presented by a client device 110 that communicates information retrieved from the client device 110 stored by the client device 110 to identify a user and identifies the content item presented by the client device 110 to the online system 140. Because the user is in the generated set of users, the online system 140 has information associated with the user allowing the online system to identify a user identifier associated with the user by the online system 140 based on the information from the tracking mechanism and to store information identifying the content item in association with the user identifier. For example, a tracking mechanism included in a content item comprises instructions that, when executed by the client device 110 presenting the content item, obtain information identifying the content item and information stored on the client device 110 identifying a user of the client device and communicate the obtained information to the online system 140. Based on identifying information associated with the user identifier of the user, the online system 140 identifies the user identifier of the user based on the obtained information and stores an identifier of the content item in association with the user identifier. Additional information, such as a date and a time when the user was presented with the content item may be stored in association with the identifier of the content item in various embodiments.

Because information maintained by the online system 140 allows identification of users in the set from different types of identifying information, the online system 140 more accurately identifies content items presented to the users in the set. For example, if a content item is presented to a user in the set on multiple client devices 110 that each maintain different information identifying the user, such as different device identifiers, a tracking mechanism included in the content item 110 communicates different information identifying the user from different client devices 110 to the online system 140 (e.g., the online system 140 receives an identifier of the content item associated with a different device identifier from each client device 110). In the preceding example, the online system 140 identifies a user identifier that is associated with the information identifying the user from each of the client device 110, allowing the online system 140 to determine that the user was presented with the content item via the different client devices 110 rather than determine that the content item 110 was presented to different users each associated with the information identifying the user from each of the different client devices 110. Hence, the online system 140 more accurately identifies unique users from the set relative to other users not in the set.

Based on the received information from client devices 110, the online system 140 determines 325 one or more metrics describing consumption of content items, such as advertisements, by users of the online system 140. For example, the online system 140 determines metrics for a content item describing a reach of the content item and a frequency with which users of the online system 140 view or otherwise interact with the content item. The reach of a content item identifies a number of unique users who were presented with the content item, while the frequency with which users interact with the content item identifies a number of times users are presented with the content item (e.g., an average number of times users are presented with the content item).

In one embodiment, the online system 140 determines a reach of a content item by identifying an identifier of the content item and identifying a number of unique user identifiers associated with the identifier of the content item. For example, the online system 140 determines a number of unique user identifiers that are associated with identifying information matching identifying information received from various client devices 110 in association with the identifier of the content item. As an example, the online system 140 determines a number of unique user identifiers associated with device identifiers or cookies matching device identifiers or cookies, respectively, associated with the identifier of the content item in information received 320 from client devices 110. The number of unique user identifiers specifies a number of unique users from the set of users who were presented with the content item.

The online system 140 may also determine a frequency with which users in the set are presented with the content item. In various embodiments, the online system 140 identifies a content item presented to users and identifies unique users to whom the content item was presented, as further described above. For example, the online system 140 receives an identifier of a content item from a third party system 130 or selects an identifier of a content item and identifies unique user identifiers associated with information indicating presentation of the content item based on information identifying users received from client devices 110 and identifying information associated with user identifiers of users in the set. For each identified unique user identifier, the online system 140 identifies a number of times the identifier of the content item is associated with a unique user identifier. Based on the number of times the identifier is associated with each unique user identifier, the online system 140 determines a frequency with which users in the set are presented with the content item. For example, the frequency is determined as an average number of times the identifier of the content item is associated with each unique user identifier or as an average number of times the identifier of the content item is associated with unique user identifiers of users to whom the content item was presented at least one time.

Determining 325 metrics describing presentation of content items based on information associated with users in the set allows the online system 140 to more accurately account for users being presented with content via multiple client devices 110, as users in the set may be identified by the online system 140 across multiple content items. This reduces the likelihood of the online system 140 identifying a content item as being presented to multiple users when a single user was presented with the content item on multiple client devices 110. As users more frequently interact with content using various client devices 110, analyzing presentation of content to users identifiable across various client devices 110 allows more accurate determination of various metrics. The online system 140 may extrapolate metrics to determine 325 based on the set of users to a larger number of users by scaling the determined metrics by a ratio based at least in part on a number of users in the set to a number of users satisfying the distribution of characteristics ore to a number of users of the online system 140. For example, the determined metrics are scaled based on a ratio of the number of users in the set, who are capable of being identified by the online system 140 across multiple client devices 110, to a number of users of the online system 140 having characteristics satisfied by the distribution who are unable to be identified by the online system 140 across multiple client devices 110. Alternatively, the online system 140 applies one or more machine learned models to the determined metrics to determine metrics for a larger number of users.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying a set of trackable users of an online system wherein each user of the set of trackable users is a user of the online system that can be tracked across multiple client devices by the online system using identifying information received from the multiple client devices, each of the multiple client devices being used to access the online system;
    accessing a distribution of characteristics of target users, the distribution of characteristics of target users indicating values of each of one or more characteristics of the target users;

generating a set of trackable target users of the online system selected from the set of trackable users of the online system such that a distribution of characteristics of the set of trackable target users of the online system match the distribution of characteristics of the target users;

receiving, from a plurality of client devices, identifying information regarding a plurality of viewing users and viewing information regarding each content item of a plurality of presented content items that are presented to each of the plurality of viewing users, the identifying information for each viewing user stored by one or more of the plurality of client devices;

associating the viewing information regarding each content item of at least some of the plurality of presented content items with a user of the set of trackable target users by matching the identifying information of the viewing user to which the content item was presented with user identifiers of the user of the set of trackable target users, the user identifiers stored at the online system; and determining one or more metrics describing consumption of content by the set of trackable target users based at least in part on the viewing information.

2. The method of claim 1, wherein determining one or more metrics describing consumption of content by the set of trackable target users based at least in part on the received information comprises:

identifying a content item presented to the trackable target users via the plurality of client devices from the viewing information received from the plurality of client devices; and determining a number of unique users in the set of viewing users to whom the identified content item was presented based at least in part on the user identifiers associated with the trackable target users of the online system that are associated with the identifying information for each viewing user.

3. The method of claim 2, wherein determining the number of unique users in the set of users to whom the identified content item was presented comprises:

identifying user identifiers associated with users in the set of viewing users that the online system has associated with identifying information identifying users maintained by the plurality of client devices who were presented with the identified content item; and determining a number of unique user identifiers from the identified user identifiers.

4. The method of claim 1, wherein determining one or more metrics describing consumption of content by the set of trackable target users based at least in part on the received information comprises:

identifying a content item presented to the viewing users via the plurality of client devices from the viewing information;

identifying unique users to whom the content item was presented based at least in part on user identifiers associated with the set of trackable target users that are associated with at least a set of the viewing users;

identifying a number of times the content item was presented to each of the identified unique users; and determining a metric as an average of the identified number of times.

5. The method of claim 1, wherein accessing the distribution of characteristics of target users comprises:

selecting users of the online system who were presented with content from a third party system based on information associated with the users by the online system;

determining the distribution of characteristics based at least in part on characteristics of the selected users.

6. The method of claim 5, wherein the information associated with the users by the online system comprises information received by the online system from one or more tracking mechanisms included in content presented by the third party system that, when executed by a client device, communicate identifying information identifying users maintained by a client device and an identifier of content from the third party system presented by the client device.

7. The method of claim 1, wherein accessing the distribution of characteristics of target users comprises:

receiving the distribution of characteristics from a third party system external to the online system.

8. The method of claim 1, wherein accessing the distribution of characteristics of target users comprises:

sampling users of the online system; and determining the distribution of characteristics based at least in part on characteristics of the sampled users.

9. The method of claim 1, further comprising:

applying one or more models to the one or more metrics for determining metrics describing consumption of content by a larger number of users than a number of users included in the set.

10. The method of claim 1, wherein the received identifying information is selected from a group consisting of: device identifiers associated with the client devices, cookies stored on the client devices, and any combination thereof.

11. A non-transitory computer program product comprising a computer readable storage medium having instructions encoded thereon that, when executed by a processor, cause the processor to:

identify a set of trackable users of an online system wherein each user of the set of trackable users is a user of the online system that can be tracked across multiple client devices by the online system using identifying information received from the multiple client devices, each of the multiple client devices being used to access the online system;

access a distribution of characteristics of target users, the distribution of characteristics of target users indicating values of each of one or more characteristics of the target users;

generate a set of trackable target users of the online system selected from the set of trackable users of the online system such that a distribution of characteristics of the set of trackable target users of the online system match the distribution of characteristics of the target users;

receive from a plurality of client devices, identifying information regarding a plurality of viewing users and viewing information regarding each content item of a plurality of presented content items that are presented to each of the plurality of viewing users, the identifying information for each viewing user stored by one or more of the plurality of client devices;

associate the viewing information regarding each content item of at least some of the plurality of presented content items with a user of the set of trackable target users by matching the identifying information of the viewing user to which the content item was presented with user identifiers of the user of the set of trackable target users, the user identifiers stored at the online system;

and
determine one or more metrics describing consumption of content by the set of trackable target users based at least in part on the viewing information.

12. The non-transitory computer program product of claim 11, wherein the determination of one or more metrics describing consumption of content by the set of trackable target users based at least in part on the received information comprises:
- identify a content item presented to the trackable target users via the plurality of client devices from the viewing information received from the plurality of client devices; and
- determine a number of unique users in the set of viewing users to whom the identified content item was presented based at least in part on the user identifiers associated with the trackable target users of the online system that are associated with the identifying information for each viewing user.

13. The non-transitory computer program product of claim 12, wherein the determination of one or more metrics describing consumption of content by the set of trackable target users to whom the identified content item was presented comprises:
- identify user identifiers associated with users in the set of viewing users that the online system has associated with identifying information identifying users maintained by the plurality of client devices who were presented with the identified content item; and
- determine a number of unique user identifiers from the identified user identifiers.

14. The non-transitory computer program product of claim 11, wherein the determination of one or more metrics describing consumption of content by the set of trackable target users based at least in part on the received information comprises:
- identify a content item presented to the viewing users via the plurality of client devices from the viewing information;
- identify unique users to whom the content item was presented based at least in part on user identifiers associated with the set of trackable target users that are associated with at least a set of the viewing users;
- identify a number of times the content item was presented to each of the identified unique users; and
- determine a metric as an average of the identified number of times.

15. The non-transitory computer program product of claim 11, wherein the access of the distribution of characteristics of target users comprises:
- select users of the online system who were presented with content from a third party system based on information associated with the users by the online system;
- determine the distribution of characteristics based at least in part on characteristics of the selected users.

16. The non-transitory computer program product of claim 15, wherein the information associated with the users by the online system comprises information received by the online system from one or more tracking mechanisms included in content presented by the third party system that, when executed by a client device, communicate identifying information identifying users maintained by the client device and an identifier of content from the third party system presented by the client device.

17. The non-transitory computer program product of claim 11, wherein the access of the distribution of characteristics of target users comprises:
- receive the distribution of characteristics from a third party system external to the online system.

18. The non-transitory computer program product of claim 11, wherein the access of the distribution of characteristics of target users comprises:
- sample users of the online system; and
- determine the distribution of characteristics based at least in part on characteristics of the sampled users.

19. The non-transitory computer program product of claim 11, wherein the computer readable storage medium further has instructions encoded thereon that, when executed by the processor, cause the processor to:
- apply one or more models to the one or more metrics for determining metrics describing consumption of content by a larger number of users than a number of users included in the set.

20. The computer program product of claim 11, wherein the received identifying information is selected from a group consisting of: device identifiers associated with the client devices, cookies stored on the client devices, and any combination thereof.

* * * * *

UNITED STATES PATENT AND TRADEMARK OFFICE
CERTIFICATE OF CORRECTION

PATENT NO. : 10,554,721 B2
APPLICATION NO. : 14/866059
DATED : February 4, 2020
INVENTOR(S) : Goran Predovic et al.

Page 1 of 1

It is certified that error appears in the above-identified patent and that said Letters Patent is hereby corrected as shown below:

In the Claims

Column 18, Line 45, Claim 11, delete "of each of one" and insert -- of each one --.

Signed and Sealed this
Eighteenth Day of August, 2020

Andrei Iancu
*Director of the United States Patent and Trademark Office*